US012705485B2

(12) United States Patent
Simonyan et al.

(10) Patent No.: US 12,705,485 B2
(45) **Date of Patent: *Aug. 11, 2026**

(54) TRAINING ACTION SELECTION NEURAL NETWORKS USING LOOK-AHEAD SEARCH

(71) Applicant: GDM Holding LLC, Mountain View, CA (US)

(72) Inventors: Karen Simonyan, London (GB); David Silver, Hitchin (GB); Julian Schrittwieser, London (GB)

(73) Assignee: GDM Holding LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/919,108

(22) Filed: Oct. 17, 2024

(65) Prior Publication Data

US 2025/0148282 A1 May 8, 2025

Related U.S. Application Data

(63) Continuation of application No. 18/528,640, filed on Dec. 4, 2023, now Pat. No. 12,147,899, which is a (Continued)

(51) Int. Cl.
*G06N 3/08* (2023.01)
*G06N 7/01* (2023.01)

(52) U.S. Cl.
CPC ................. *G06N 3/08* (2013.01); *G06N 7/01* (2023.01)

(58) Field of Classification Search
CPC ........ G06N 3/08; G06N 7/005; G06N 3/0472; G06N 5/003; G06N 3/006

(Continued)

(56) References Cited

U.S. PATENT DOCUMENTS

| | | | |
|---|---|---|---|
| 9,008,840 | B1 | 4/2015 | Ponulak et al. |
| 11,449,750 | B2 | 9/2022 | Simonyan et al. |

(Continued)

OTHER PUBLICATIONS

Abe et al., "Empirical Comparison of Various Reinforcement Learning Strategies for Sequential Targeted Marketing," IEEE International Conference on Data Mining, Dec. 2002, 8 pages.

(Continued)

*Primary Examiner* — Fitwi Y Hailegiorgis
(74) *Attorney, Agent, or Firm* — Fish & Richardson P.C.

(57) ABSTRACT

Methods, systems and apparatus, including computer programs encoded on computer storage media, for training an action selection neural network. One of the methods includes receiving an observation characterizing a current state of the environment; determining a target network output for the observation by performing a look ahead search of possible future states of the environment starting from the current state until the environment reaches a possible future state that satisfies one or more termination criteria, wherein the look ahead search is guided by the neural network in accordance with current values of the network parameters; selecting an action to be performed by the agent in response to the observation using the target network output generated by performing the look ahead search; and storing, in an exploration history data store, the target network output in association with the observation for use in updating the current values of the network parameters.

20 Claims, 5 Drawing Sheets

Related U.S. Application Data continuation of application No. 17/948,016, filed on Sep. 19, 2022, now Pat. No. 11,836,625, which is a continuation of application No. 16/617,478, filed as application No. PCT/EP2018/063869 on May 28, 2018, now Pat. No. 11,449,750.

(60) Provisional application No. 62/511,945, filed on May 26, 2017.

(58) Field of Classification Search
USPC ........................................................ 706/25
See application file for complete search history.

(56) References Cited

U.S. PATENT DOCUMENTS

| | | | | |
|---|---|---|---|---|
| 12,147,899 | B2 * | 11/2024 | Simonyan | G06N 3/006 |
| 2014/0277718 | A1 | 9/2014 | Izhikevich | |
| 2015/0106315 | A1 * | 4/2015 | Birdwell | G06N 3/0442 706/25 |
| 2015/0106316 | A1 | 4/2015 | Birdwell et al. | |
| 2015/0127149 | A1 | 5/2015 | Sinyavskiy | |

OTHER PUBLICATIONS

Anthony et al., "Thinking Fast and Slow with Deep Learning and Tree Search," https://arxiv.org/abs/1705.08439v1, May 2017, 17 pages.
Barto et al., "Monte Carlo Matrix Inversion and Reinforcement Learning," retrieved from URL <https://pdfs.semanticscholar.org/4315/56f0e52d620689579d8145607e4410f06994.pdf>, 1994, 687-694.
Baxter et al., "Learning to Play Chess Using Temporal Differences," Machine Learning, Sep. 2000, 40:243-263.
Bertsekas, "Approximate policy iteration: a survey and some new methods," Journal of Control Theory and Applications, Jul. 2011, 9:310-335.
Browne et al., "A Survey of Monte Carlo Tree Search Methods," IEEE Transactions on Computational Intelligence and AI in Games, Mar. 2012, 43 pages.
Buro, "From Simple Features to Sophisticated Evaluation Functions," International Conference on Computers and Games, Mar. 1999, 20 pages.
Cazenave et al., "Using a Monte-Carlo approach for bus regulation," 2009 12th International IEEE Conference on Intelligent Transportation Systems, Oct. 2009, 340-345.
Cazenave, "Residual Networks for Computer Go," IEEE Transactions on Games , Mar. 2017, 4 pages.
Clark et al., "Training Deep Convolutional Neural Networks to Play Go," Proceedings of the 32nd International Conference on Machine Learning, Jul. 2015, 9 pages.
Coulom, "Computing Elo Ratings of Move Patterns in the Game of Go," Int. Comput. Games Assoc. J., Jan. 2007, 30:11 pages.
Coulom, "Efficient Selectivity and Backup Operators in Monte-Carlo Tree Search," Proceedings of the 5th International Conference on Computers and Games, retrieved from URL <https://refs.devinmcgloin.com/artificial_intelligence/efficient-selectivity-and-backup-operators-in-monte-carlo-tree-search.pdf>, May 2006, 12 pages.
Coulom, R. "Whole-History Rating: A Bayesian Rating System for Players of Time-Varying Strength," Int. Conf. Comput. Games, 2008, vol. 5131:113-124.
Dosovitskiy et al., "Learning to Act by Predicting the Future," https://arxiv.org/abs/1611.01779v2, last revised Feb. 2017, 14 pages.
Enzenberger, "Evaluation in Go by a Neural Network Using Soft Segmentation," Advances in Computer Games, 2003, 97-108.
Enzenberger, "The Integration of a Prior Knowledge into a Go Playing Neural Network," retrieved from URL <http://www.cgl.ucsf.edu/go/Programs/NeuroGo.pdf>, Sep. 1996, 8 pages.
EP Office Action in European Appln. No. 18727294.3, dated Jun. 9, 2021, 9 pages.
Evans et al., "DeepMind AI Reduces Google Data Centre Cooling Bill by 40%," retrieved from URL <https://deepmind.com/blog/article/deepmind-ai-reduces-google-data-centre-cooling-bill-40>, Jul. 2016, retrieved on Mar. 9, 2020, 6 pages.
Foerster et al., "Stabilizing Experience Replay for Deep Multi-Agent Reinforcement Learning," https://arxiv.org/abs/1702.08887v2, Jun. 2017, 10 pages.
Fukushima et al., "Neocognitron: A Self-organizing Neural Network Model for a Mechanism of Pattern Recognition Unaffected by Shift in Position," Biological Cybernetics, Apr. 1980, 36:193-202.
Gelly et al., "Modification of UCT with Patterns in Monte-Carlo Go," INRIA, retrieved from URL <https://hal.inria.fr/inria-00117266v3/document>, Nov. 2006, 6062:25 pages.
Gelly et al., "Monte-Carlo tree search and rapid action value estimation in computer Go," Artificial Intelligence, Jul. 2011, 175(11):1856-1875.
Guo et al., "Deep learning for real-time Atari game play using offline Monte-Carlo tree search planning," retrieved from URL<http://citeseerx.ist.psu.edu/viewdoc/download?doi=10.1.1.859.328&rep=rep1&type=pdf>, Dec. 2014, 9 pages.
Hahnloser et al., "Digital selection and analogue amplification coexist in a cortex-inspired silicon circuit," Nature, Jun. 2000, 405:947-951.
He et al., "Deep Residual Learning for Image Recognition," 2016 IEEE Conference on Computer Vision and Pattern Recognition (CVPR), Jun. 2016, 770-778.
Heinrich et al., "Deep Reinforcement Learning from Self-Play in Imperfect-Information Games," https://arxiv.org/abs/1603.01121v2, last revised Jun. 2016, 10 pages.
Ioffe et al., "Batch Normalization: Accelerating Deep Network Training by Reducing Internal Covariate Shift," https://arxiv.org/abs/1502.03167v3, last revised Mar. 2015, 11 pages.
Jaderberg et al., "Reinforcement Learning with Unsupervised Auxiliary Tasks," https://arxiv.org/abs/1611.05397, Nov. 2016, 14 pages.
Jouppi et al., "In-Datacenter Performance Analysis of a Tensor Processing Unit," Proceedings of the 44th Annual International Symposium on Computer Architecture, Jun. 2017, 12 pages.
Kober et al., "Reinforcement Learning in Robotics: A Survey," Int. J. Robot. Res., 2013, 32:1238-1274.
Kocsis et al., "Bandit Based Monte-Carlo Planning," European Conference on Machine Learning, Sep. 2006, 282-293.
Krizhevsky et al., "ImageNet Classification with Deep Convolutional Neural Networks," retrieved from URL <http://vision.cse.psu.edu/people/chrisF/deep-learning/Papers/KrizhevskyNIPS12Imagenet.pdf>, 2012, 9 pages.
Lagoudakis et al., "Reinforcement Learning as Classification: Leveraging Modern Classifiers," Proceedings of the Twentieth International Conference on International Conference on Machine Learning, Aug. 2003, 8 pages.
Lai, "Giraffe: Using Deep Reinforcement Learning to Play Chess," Dissertation for MSc degree, retrieved from URL <https://arxiv.org/pdf/1509.01549v2.pdf>, Imperial College London, Sep. 2015, 39 pages.
Laurent et al., "The world of independent learners is not markovian," International Journal of Knowledge-based and Intelligent Engineering Systems, Mar. 2011, 15:55-64.
LeCun et al., "Convolutional Networks for Images, Speech, and Time Series," The Handbook of Brain Theory and Neural Networks, 1995, 255-258.
LeCun et al., "Deep learning," Nature, May 2015, 521:436-444.
Littman, "Markov games as a framework for multi-agent reinforcement learning," Machine Learning Proceedings of the Eleventh International Conference, Jul. 1994, 157-163.
Maddison et al., "Move Evaluation in Go Using Deep Convolutional Neural Networks," https://arxiv.org/abs/1412.6564v2, last revised Apr. 2015, 8 pages.
Mandziuk, "Computational Intelligence in Mind Games," Challenges for Computational Intelligence, Jun. 2007, 407-442.
Mechner, "All Systems Go," The Sciences, Jan. 1998, 32-37.

(56) References Cited

OTHER PUBLICATIONS

Mnih et al., “Asynchronous Methods for Deep Reinforcement Learning,” Proceedings of the 33rd International Conference on Machine Learning, Jun. 2016, 10 pages.

Mnih et al., “Human-level control through deep reinforcement learning,” Nature, Feb. 2015, 518:529-533.

Moravcik et al., “DeepStack: Expert-level artificial intelligence in heads-up no-limit poker,” Science, retrieved from URL <https://arxiv.org/abs/1701.01724v3>, Mar. 2017, 37 pages.

Müller, “Computer Go,” Artificial Intelligence, Jan. 2002, 134:145-179.

PCT International Preliminary Report on Patentability in International Appln. No. PCT/EP2018/063869, mailed Dec. 5, 2019, 11 pages.

PCT International Search Report and Written Opinion in International Appln. No. PCT/EP2018/063869, mailed Sep. 3, 2018, 17 pages.

Rosin, “Multi-armed bandits with episode context,” Annals of Mathematics and Artificial Intelligence, Aug. 2011, 61:203-230.

Samuel, “Some Studies in Machine Learning Using the Game of Checkers II—Recent Progress,” IBM J. Res. Develop., Nov. 1967, 11:601-617.

Schaeffer et al., “Temporal difference learning applied to a high-performance game-playing program,” Proceedings of the 17th international joint conference on Artificial intelligence, Aug. 2001, 1:529-534.

Scherrer et al., “Approximate Modified Policy Iteration and its Application to the Game of Tetris,” Journal of Machine Learning Research, Aug. 2015, 16:1629-1676.

Scherrer, “Approximate Policy Iteration Schemes: A Comparison,” Proceedings of the 31st International Conference on Machine Learning, Jan. 2014, 9 pages.

Schraudolph et al., “Temporal Difference Learning of Position Evaluation in the Game of Go,” Advances in Neural Information Processing, 1994, 8 pages.

Segal, “On the Scalability of Parallel UCT,” Comput. Games, 2011, 6515:36-47.

Shahriari et al., “Taking the Human Out of the Loop: A Review of Bayesian Optimization,” Proceedings of the IEEE, Jan. 2016, 104:148-175.

Sheppard, “World-championship-caliber Scrabble,” Artificial Intelligence, Jan. 2002, 134:241-275.

Silver et al., “Concurrent Reinforcement Learning from Customer Interactions,” In Proc. 30th Int. Conf. Mach. Learn., Feb. 2013, 9 pages.

Silver et al., “Mastering the game of Go with deep neural networks and tree search,” Nature, Jan. 2016, 529:20 pages.

Silver et al., “Temporal-difference search in computer Go,” Machine Learning, Feb. 2012, 87:183-219.

Silver, “Reinforcement Learning and Simulation-Based Search in Computer Go,” Thesis for the degree of Doctor of Philosophy, University of Alberta, 2009, 170 pages.

Singh et al., “Reinforcement Learning with Replacing Eligibility Traces,” Machine Learning, Jan. 1996, 22:123-158.

Sutton, “Learning to Predict by the Methods of Temporal Differences,” Machine Learning, Aug. 1988, 3:9-44.

Tesauro et al., “On-line Policy Improvement using Monte-Carlo Search,” In Adv. Neural Inf. Process. Syst., retrieved from URL <https://pdfs.semanticscholar.org/3552/fba431aa866bf9de293bebf7eff168e9e19c.pdf>, Dec. 1996, 1068-1074.

Tesauro, “Neurogammon: a neural-network backgammon program,” 1990 IJCNN International Joint Conference on Neural Networks, Jun. 1990, 3:33-39.

Tesauro, “TD-Gammon, a Self-Teaching Backgammon Program, Achieves Master-Level Play,” Neural Computation, Mar. 1994, 6:215-219.

Tian et al., “Better Computer Go Player with Neural Network and Long-term Prediction,” https://arxiv.org/abs/1511.06410v3, last revised Feb. 2016, 10 pages.

Veness et al., “Bootstrapping from Game Tree Search,” In Adv. Neural Inf. Process. Syst., retrieved from URL <http://blair.web.cse.unsw.edu.au/pubs/2009VenessSilverUtherBlairNIPS.pdf>, 2009, 9 pages.

Zhang et al., “A Reinforcement Learning Approach to Job-shop Scheduling,” Proceedings of the 14th international joint conference on Artificial intelligence, Aug. 1995, 1114-1120.

* cited by examiner

TRAINING ACTION SELECTION NEURAL NETWORKS USING LOOK-AHEAD SEARCH

CROSS-REFERENCE TO RELATED APPLICATIONS

This application is a continuation of, and claims priority to, U.S. application Ser. No. 18/528,640, filed on Dec. 4, 2023, which is a continuation of U.S. application Ser. No. 17/948,016, filed on Sep. 19, 2022 (now U.S. Pat. No. 11,836,625), which is a continuation of U.S. application Ser. No. 16/617,478, filed on Nov. 26, 2019 (now U.S. Pat. No. 11,449,750), which is a national stage application under § 371 and which claims priority to International Application No. PCT/EP2018/063869, filed on May 28, 2018, which claims the benefit under 35 U.S.C. § 119 (e) of U.S. Provisional Application No. 62/511,945, filed on May 26, 2017. The disclosures of the prior applications are considered part of and are incorporated by reference in the disclosure of this application.

BACKGROUND

This specification relates to selecting actions to be performed by a reinforcement learning agent.

Reinforcement learning agents interact with an environment by receiving an observation that characterizes the current state of the environment, and in response, performing an action. Once the action is performed, the agent receives a reward that is dependent on the effect of the performance of the action on the environment.

Some reinforcement learning systems use neural networks to select the action to be performed by the agent in response to receiving any given observation.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to reinforcement learning.

In one innovative aspect there is described a method of training a neural network having a plurality of network parameters. The neural network is used to select actions to be performed by an agent interacting with an environment to perform a task in an attempt to achieve a specified result. The neural network is configured to receive an input observation characterizing a state of the environment and to process the input observation in accordance with the network parameters to generate a network output that comprises an action selection output that defines an action selection policy for selecting an action to be performed by the agent in response to the input observation. The method may comprise receiving a current observation characterizing a current state of the environment. The method may further comprise determining a target network output for the current observation by performing a look ahead search of possible future states of the environment starting from the current state until the environment reaches a possible future state that satisfies one or more termination criteria. The look ahead search may be guided by the neural network in accordance with current values of the network parameters. The method may further comprise selecting an action to be performed by the agent in response to the current observation using the target network output generated by performing the look ahead search. The method may further comprise storing, in an exploration history data store, the target network output in association with the current observation for use in updating the current values of the network parameters.

Advantages of such an approach are described later, but these can include the ability to learn effectively in very large/complex state spaces and/or where there is a very sparse reward signal. In concrete terms this translates to a reinforcement learning system which can achieve substantially improved performance on a learned task whilst at the same time substantially reducing the amount of processing power and memory needed for training. This reduced processing power can translate, in implementations, into a significantly reduced electrical power consumption, for example by reducing the amount of specialist hardware needed to perform the training in a practical time frame. It can also facilitate implementing a high-performance reinforcement learning system on a physically smaller computing device. Similar advantages can be achieved in implementations of a correspondingly trained reinforcement learning system, described later.

In implementations the look ahead search may be a search through a state tree having nodes representing states of the environment, for example starting from a root node that represents the current state. As described later the data defining the tree may organized in any convenient manner. The search may continue until a terminal, e.g., leaf node, state of the search is reached representing a (possible) future state of the environment. In general this is different to a terminal state of an episode of interactions which may be defined by performance (or failure of performance) of the task or otherwise as described later.

In some implementations the, or another, network provides a predicted expected return output, i.e. an estimate of a return resulting from the environment being in the state. In broad terms this may be considered as a state-based value function. The method may then comprise determining a target return based on evaluating progress of the task as determined at the terminal state of the current episode of interaction, for example based on the end result achieved. This may be used for updating the neural network that generates the target network output.

Performing the look ahead search may comprise traversing the state tree until a leaf node is reached. This may comprise selecting one of multiple edges connecting to a first node, based on an action score for the edge, to identify the next node in the tree. The action score relates to an action which, when performed, moves from a (possible) state of the environment represented by the first node to a (possible) state represented by the next node. The action score may optionally be adjusted by an amount dependent upon a prior probability for the action, which may be provided by the network output of the action selection neural network. The adjustment may be reduced according to a count of how many times the respective edge has been traversed, to encourage exploration. Optionally noise may be added to the prior probabilities for a node, in particular the root node for a look ahead search. Leaf nodes may be evaluated in accordance with current values of the network parameters, more particularly generating the prior probabilities for the outgoing edges of the leaf node using a predicted probability distribution over the actions. The action scores may be determined by initializing an action score then updating the score using the results of one or more look ahead searches that traverse the corresponding edge.

In some implementations the method may further comprise obtaining, from the exploration history store, a training observation and a training target network output associated with the training observation. The training observation may be processed using the neural network to generate a training network output. The method may then determine a gradient with respect to the network parameters of an objective function that encourages the training network output to match the training target network output, which may then be used to update the network parameters.

In broad terms, the look ahead search determines a target network output, which may then be stored to provide the training target network output later. The training target network output is used to improve the neural network, which is itself used for determining the target network output in a next iteration. The (training) target network output from the look ahead search may comprise a vector of action scores or probabilities ($\pi$); these may be proportional to the visit count N of each action from a root node of the search, or to $N^{1/\tau}$ where $\tau$ is a temperature.

In some implementations the network output may comprise both policy data, such as a vector of action scores or probabilities give a state, and state value data, such as the predicted expected return of a state, and both these may be updated. Thus the action selection output may define a probability distribution over possible actions to be performed by the agent. However in in general any reinforcement learning technique may be employed. Thus in some other implementations the action selection output may comprises a respective Q value for each of a plurality of possible actions, where the Q-value represents an expected return to be received if the agent performs the possible action in response to the observation. Alternatively the action selection output may directly identify or define an optimal action to be performed by the agent in response to the observation.

An objective function that encourages the training network output to match the training target network output may comprise, for example, any suitable loss function which is dependent upon a measure of a difference (or similarity) between the training network output and the training target network output.

By way of example a suitable objective function may comprise a term dependent upon a difference between the probability distribution ($\pi$) in the training target network output and the probability distribution (p) in the training network output, for example $\pi^T \log p$. Additionally or alternatively a suitable objective function may comprise a term dependent upon a difference between the predicted expected return output in the training target network output and the predicted expected return output in the training network output, for example a mean squared error between these terms.

There is also described a trained a neural network system comprising a trained neural network having a plurality of trained network parameters. The neural network system is configured to select actions to be performed by an agent interacting with an environment to perform a task in an attempt to achieve a specified result. The trained neural network is configured to receive an input observation characterizing a state of the environment and to process the input observation in accordance with the trained network parameters to generate a network output that comprises an action selection output that defines an action selection policy for selecting an action to be performed by the agent in response to the input observation. The neural network system may comprise an input to receive a current observation characterizing a current state of the environment. The neural network system may further comprise an output for selecting an action to be performed by the agent in response to the current observation according to the action selection output. The neural network system may be configured to provide the output for selecting the action by performing a look ahead search, wherein the look ahead search comprises a search of possible future states of the environment starting from the current state until the environment reaches a possible future state that satisfies one or more termination criteria. The look ahead search may be guided by the trained neural network in accordance with values of the network parameters, in particular such that the search is dependent upon the action selection output from the trained neural network.

There is further provided a method of training a controller neural network, wherein the controller neural network has a state vector input to receive state data from a subject system having a plurality of states; an action probability vector data output to output an action probability vector defining a set of probabilities for implementing each of a corresponding set of actions, wherein an action performed on the subject system moves the system from a state defined by the state data to another of the states; a baseline value data output to output a baseline value dependent upon a baseline likelihood of the subject system providing a reward when in a state defined by the state data; and a plurality of neural network layers between the state vector input and the action probability vector data output and the value data output, wherein the layers are connected by a plurality of weights; wherein the method comprises: implementing a succession of actions on the subject system to move the system through a succession of the states, wherein actions of the succession of actions are selected according to a guided look ahead search guided by the controller neural network; generating and storing probability data for actions and states selected according to the guided look ahead search; updating the controller neural network using the stored data; and implementing a further succession of actions on the subject system according to a guided look ahead search guided by the updated controller neural network.

There is also provided a data processor comprising a neural network including: a state vector input to receive state data from a subject system having a plurality of states; an action probability vector data output to output an action probability vector defining a set of probabilities for implementing each of a corresponding set of actions, wherein an action performed on the subject system moves the system from a state defined by the state data to another of the states; a baseline value data output to output a baseline value dependent upon a baseline likelihood of the subject system providing a reward when in a state defined by the state data; and a plurality of neural network layers between the state vector input and the action probability vector data output and the value data output, wherein the layers are connected by a plurality of weights; and a training module configured to: implement a succession of actions on the subject system to move the system through a succession of the states, wherein actions of the succession of actions are selected according to a guided look ahead search guided by the neural network; generate guided look ahead search probabilities for actions and states selected according to the guided look ahead search; store in memory state exploration history data comprising, for states of the succession of states, state data defining the states, guided look ahead search probability data for the states, and reward data defining an expected or actual reward associated with the state; train the neural network using the state exploration history data to update the weights of the neural network; and implement a further succession of actions on the subject system according to a guided look ahead search guided by the neural network with the updated weights, to generate further state exploration history data for training the neural network.

There is also provided a trained electronic controller comprising: a state vector input to receive state data from a subject system having a plurality of states; an action probability vector data output to output an action probability vector defining a set of probabilities for implementing each of a corresponding set of actions, wherein an action performed on the subject system moves the system from a state defined by the state data to another of the states; a baseline value data output to output a baseline value dependent upon a baseline likelihood of the subject system providing a reward when in a state defined by the state data; and a plurality of neural network layers between the state vector input and the action probability vector data output and the value data output, wherein the layers are connected by a plurality of weights; and a control system configured to: implement a succession of actions on the subject system to move the system through a succession of the states, wherein actions of the succession of actions are selected according to a guided look ahead search guided by the neural network, wherein the guided look ahead search comprises a search through potential future actions and states guided by the neural network such that the search through potential future actions and states is dependent upon one or both of the action probability vector and the baseline value from the neural network from successive potential future states defined by the potential future actions.

The subject matter described in this specification can be implemented in particular embodiments so as to realize one or more of the following advantages. Actions to be performed by an agent interacting with an environment to perform a task that has a very large state space can be effectively selected. In other words, the actions can be effectively selected to maximize the likelihood that a desired result, such as performance of a learned task, will be achieved. In particular, actions can effectively be selected even when the environment has a state tree that is too large to be exhaustively searched. By using a neural network to guide a look ahead search during learning, the effectiveness of the training process can be increased and the neural network can be trained to have a high level of performance on the task over fewer training iterations and using fewer computational resources. In implementations, by using the same neural network to predict both the action selection policy and the value of the current state, i.e., the predicted return, the amount of computational resources consumed by the neural network to effectively select an action can be reduced. Additionally, by employing the described guided look ahead search during learning, the neural network can be trained to achieve a high level of performance on the task with no external supervision (other than a very sparse reward signal) or any human or other expert data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
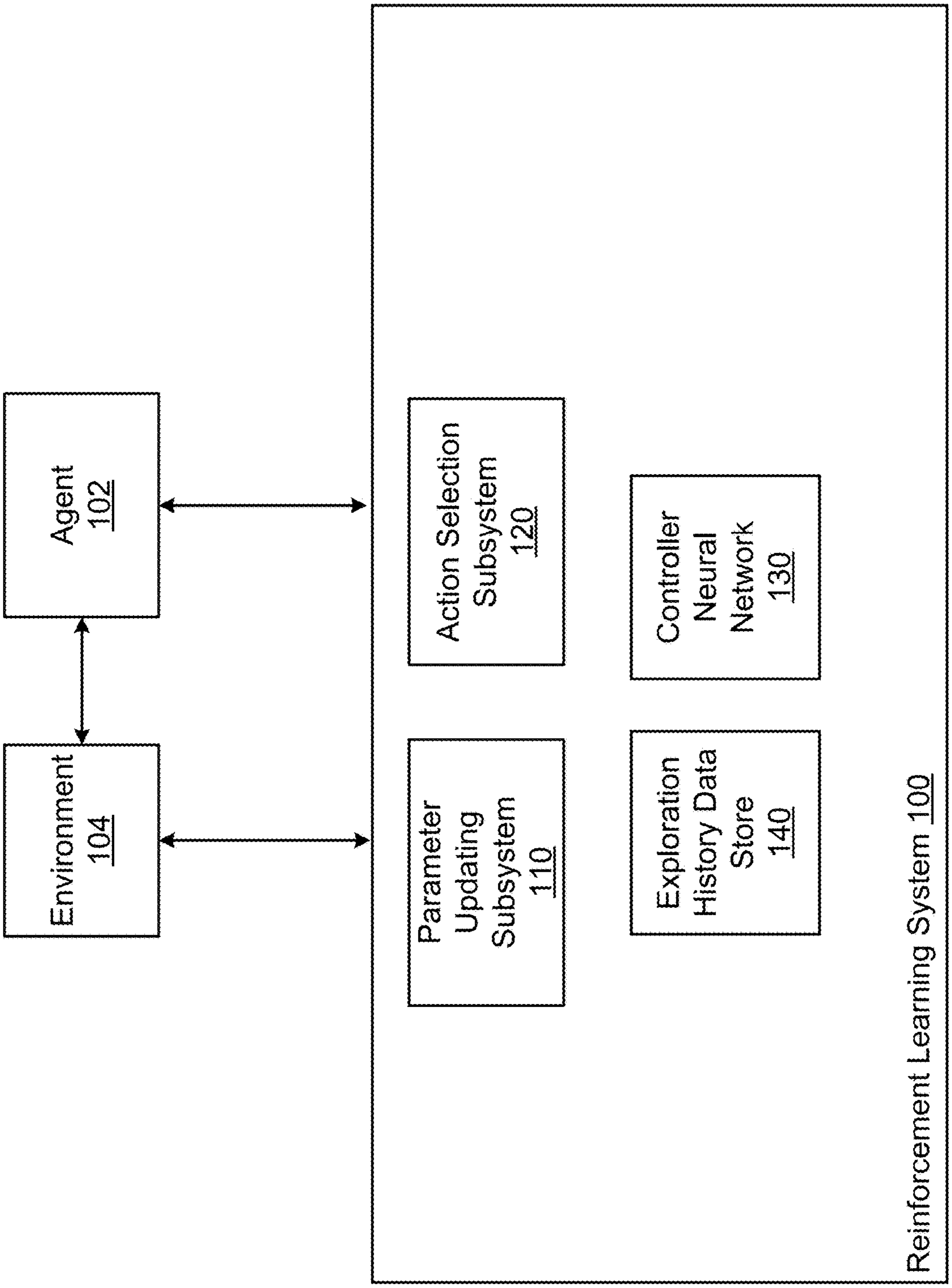
FIG. 1 shows an example reinforcement learning system.

This specification generally describes a reinforcement learning system that selects actions to be performed by a reinforcement learning agent interacting with an environment. In order to interact with the environment, the reinforcement learning system receives data characterizing the current state of the environment and selects an action from a set of actions to be performed by the agent in response to the received data. Once the action has been selected by the reinforcement learning system, the agent performs the action to interact with the environment.

Generally, the agent interacts with the environment in order to perform a particular task, i.e., achieve a specified result, and the reinforcement learning system selects actions in order to maximize the likelihood of completing the task, i.e., of achieving the result.

In some implementations, the environment is a real-world environment and the agent is a control system for a mechanical agent interacting with the real-world environment. For example, the agent may be a control system integrated in an autonomous or semi-autonomous vehicle navigating through the environment. In these implementations, the actions may be possible control inputs to control the vehicle and the result that the agent is attempting to achieve is to satisfy objectives for the navigation of the vehicle through the real-world environment. For example, the objectives can include one or more of: reaching a destination, ensuring the safety of any occupants of the vehicle, minimizing energy used in reaching the destination, maximizing the comfort of the occupants, and so on.

As another example, the agent may be a robot or other mechanical agent interacting with the environment to achieve a specific task, e.g., to locate an object of interest in the environment or to move an object of interest to a specified location in the environment. In these implementations, the actions may be possible control inputs to control the robot.

In some other implementations the real-world environment may be a manufacturing plant or service facility, the observations may relate to operation of the plant or facility, for example to resource usage such as power consumption, and the agent may control actions or operations in the plant/facility, for example to reduce resource usage.

Thus in general terms, in implementations the agent may be a mechanical or electronic agent and the actions may comprise control inputs to control the mechanical or electronic agent. The observations may be derived from sensors, for example image sensors, and/or they may be derived from electrical or mechanical signals from the agent.

In some further implementations, the environment is a real-world environment and the agent is a computer system that generates outputs for presentation to a user.

For example, the environment may be a patient diagnosis environment such that each state is a respective patient state of a patient, i.e., as reflected by health data characterizing the health of the patient, and the agent may be a computer system for suggesting treatment for the patient. In this example, the actions in the set of actions are possible medical treatments for the patient and the result to be achieved can include one or more of maintaining a current health of the patient, improving the current health of the patient, minimizing medical expenses for the patient, and so on. The observations may comprise data from one or more sensors, such as image sensors or biomarker sensors, and/or may comprise processed text, for example from a medical record.

As another example, the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may comprise direct or indirect observations of a state of the protein and/or may be derived from simulation.

In some other implementations, the environment is a simulated environment and the agent is implemented as one or more computer programs interacting with the simulated environment. For example, the simulated environment may be a virtual environment in which a user competes against a computerized agent to accomplish a goal and the agent is the computerized agent. In this example, the actions in the set of actions are possible actions that can be performed by the computerized agent and the result to be achieved may be, e.g., to win the competition against the user.

Generally, the system uses a neural network to select actions to be performed by the agent interacting with the environment. The neural network has a set of network parameters and is configured to receive an input observation characterizing a state of the environment and to process the input observation in accordance with the network parameters to generate a network output that includes an action selection output that defines an action selection policy for selecting an action to be performed by the agent in response to the input observation.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102 interacting with an environment 104. That is, the reinforcement learning system 100 receives observations, with each observation being data characterizing a respective state of the environment 104, and, in response to each received observation, selects an action from a set of actions to be performed by the reinforcement learning agent 102 in response to the observation.

Once the reinforcement learning system 100 selects an action to be performed by the agent 102, the reinforcement learning system 100 instructs the agent 102 and the agent 102 performs the selected action. Generally, the agent 102 performing the selected action results in the environment 104 transitioning into a different state.

The observations characterize the state of the environment in a manner that is appropriate for the context of use for the reinforcement learning system 100.

For example, when the agent 102 is a control system for a mechanical agent interacting with the real-world environment, the observations may be images captured by sensors of the mechanical agent as it interacts with the real-world environment and, optionally, other sensor data captured by the sensors of the agent.

As another example, when the environment 104 is a patient diagnosis environment, the observations may be data from an electronic medical record of a current patient.

As another example, when the environment 104 is a protein folding environment, the observations may be images of the current configuration of a protein chain, a vector characterizing the composition of the protein chain, or both.

In particular, the reinforcement learning system 100 selects actions using an action selection neural network 130.

Generally, the action selection neural network 130 is a neural network that is configured to receive a network input including an observation and to process the network input in accordance with parameters of the action selection neural network ("network parameters") to generate a network output. The network output includes an action selection output and, in some cases, a predicted expected return output. Typically the predicted expected return is a second output from another "head" of the action selection neural network but it may be generated by a separate second neural network which may be jointly trained with the action selection neural network.

The action selection output defines an action selection policy for selecting an action to be performed by the agent in response to the input observation.

In some cases, the action selection output defines a probability distribution over possible actions to be performed by the agent. For example, the action selection output can include a respective action probability for each action in a set of possible actions that can be performed by the agent to interact with the environment. In another example, the action selection output can include parameters of a distribution over the set of possible actions.

In some other cases, the action selection output includes a respective Q value for each of a plurality of possible actions. A Q value for a possible action represents an expected return to be received if the agent performs the possible action in response to the observation.

In some cases, the action selection output identifies an optimal action from the set of possible action to be performed by the agent in response to the observation. For example, in the case of controlling a mechanical agent, the action selection output can identify torques to be applied to one or more joints of the mechanical agent.

The predicted expected return output for a given observation is an estimate of a return resulting from the environment being in the state characterized by the observation, with the return typically being a numeric reward or a combination, e.g., a time-discounted sum, of numeric rewards received as a result of the agent interacting with the environment. The predicted expected return may be designated by a scalar value V(s). Generally, the rewards reflect the progress of the agent toward accomplishing the specified result. In many cases, the rewards will be sparse, with the only reward being received being at a terminal state of any given episode of interactions and indicating whether the specified result was achieved or not.

The remainder of this specification will describe cases where the action selection output is or defines a probability distribution over the possible actions to be performed by the agent. However, one of ordinary skill in the art will appreciate that these cases can readily be adapted to train and use neural networks that generate one of the other kinds of action selection output referenced above.

To allow the agent 102 to effectively interact with the environment 104, the reinforcement learning system 100 trains the neural network 130 to determine trained values of the network parameters.

In particular, the training includes two parts: an action selection part and a parameter updating part.

During the action selection part, an action selection subsystem 120 receives observations and selects actions to be performed by the agent in response to the observations to interact with the environment by performing a look ahead search using the neural network 130. In particular, for a given episode of interactions, i.e., a set of interactions that starts at an initial state and ends at a terminal state for the episode, the action selection subsystem 120 selects actions based on the results of the look ahead search instead of directly using the action selection outputs generated by the neural network 130. Based on the results of the interactions, the action selection subsystem 120 generates exploration histories and stores the exploration histories in an exploration history data store 140. Performing the look ahead search and generating exploration histories is described below with reference to FIGS. 2-4.

During the parameter updating part, a parameter updating subsystem 110 obtains exploration histories from the exploration history data store 140 and uses the histories to update the values of the parameters of the neural network 130. Updating the values of the parameters of the neural network 130 is described below with reference to FIG. 5.

During the training, the action selection subsystem 120 and the parameter updating subsystem 110 repeatedly perform their corresponding parts of the training process asynchronously and in parallel. In some cases, one or both of these parts of the process are distributed, so that many different instances of the neural network 130 are trained in parallel, with the computation spread out across multiple computing units, e.g., multiple computers or multiple cores within a single computer.

In some implementations, the action selection subsystem 120 performs the look ahead search using a simulated version of the environment 104.

Generally, the simulated version of the environment 104 is a virtualized environment that simulates how actions performed by the agent 120 would affect the state of the environment 104.

For example, when the environment 104 is a real-world environment and the agent is an autonomous or semi-autonomous vehicle, the simulated version of the environment is a motion simulation environment that simulates navigation through the real-world environment. That is, the motion simulation environment simulates the effects of various control inputs on the navigation of the vehicle through the real-world environment. More generally, when the environment 104 is a real-world environment and the agent is a mechanical agent the simulated version of the environment is a dynamics model that models how actions performed by the agent change the state of the environment 104.

As another example, when the environment 104 is a patient diagnosis environment, the simulated version of the environment is a patient health simulation that simulates effects of medical treatments on patients. For example, the patient health simulation may be a computer program that receives patient information and a treatment to be applied to the patient and outputs the effect of the treatment on the patient's health.

As another example, when the environment 104 is a protein folding environment, the simulated version of the environment is a simulated protein folding environment that simulates effects of folding actions on protein chains. That is, the simulated protein folding environment may be a computer program that maintains a virtual representation of a protein chain and models how performing various folding actions will influence the protein chain.

As another example, when the environment 104 is the virtual environment described above, the simulated version of the environment is a simulation in which the user is replaced by another computerized agent.

In some implementations, the action selection subsystem 120 performs the look ahead search by performing a tree search guided by the outputs of the neural network 130. In particular, in these implementations, the action selection subsystem 120 maintains data representing a state tree of the environment 104. The state tree includes nodes that represent states of the environment 104 and directed edges that connect nodes in the tree. An outgoing edge from a first node to a second node in the tree represents an action that was performed in response to an observation characterizing the first state and resulted in the environment transitioning into the second state.

While the data is logically described as a tree, the action selection subsystem 120 can be represented by any of a variety of convenient physical data structures, e.g., as multiple triples or as an adjacency list.

The action selection subsystem 120 also maintains edge data for each edge in the state tree that includes (i) an action score for the action represented by the edge, (ii) a visit count for the action represented by the edge, and (iii) a prior probability for the action represented by the edge.

At any given time, the action score for an action represents the current estimate of the return that will be received if the action is performed, the visit count for the action is the current number of times that the action has been performed by the agent 102 in response to observations characterizing the respective first state represented by the respective first node for the edge, and the prior probability represents the likelihood that the action is the action that should be performed 102 in response to observations characterizing the respective first state.

The action selection subsystem 120 updates the data representing the state tree and the edge data for the edges in the state tree from look ahead searches performed using the neural network 130 during training. Performing the look ahead search is described in more detail below with reference to FIGS. 2-4.

In some implementations, the system 100 uses the action selection outputs generated by the neural network 130 directly in selecting actions in response to observations after the neural network 130 has been trained. In other implementations, the system 100 continues performing look ahead searches using the neural network 130 and selecting actions to be performed by the agent using the results of those look ahead searches even after the neural network has been trained.

Figure 2:
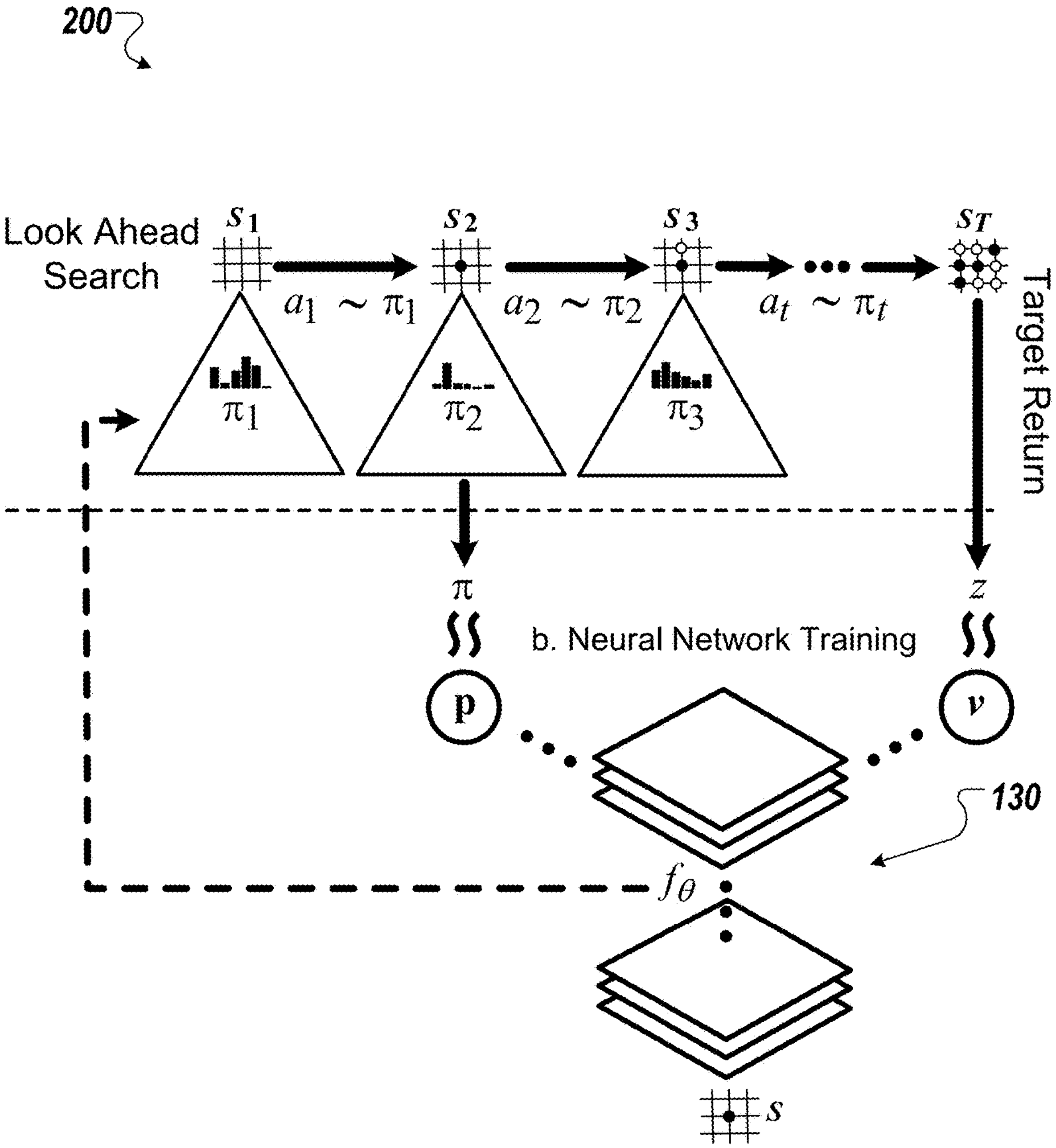
FIG. 2 is a diagram of generating an experience history and using the experience history to update the values of the parameters of the neural network.

FIG. 2 is a diagram 200 of generating an experience history and using the experience history to update the values of the parameters of the neural network 130.

As shown in FIG. 2, during one episode of performing a task, the system selects actions to be performed by the agent in response to observations $s_1$ through $s_T$, i.e., starting from when the environment is in an initial state $s_1$ and until the environment reaches a terminal state $s_T$. The terminal state of an episode may be a state in which the specified result has been achieved, a state that the environment is in after a specified number of actions have been performed after the environment was in the initial state without the specified result having been achieved, or a state in which the system determines that the result is not likely to be achieved.

In particular, in response to each of the observations s the system generates a target action selection output $\pi$ that defines a probability distribution over the set of actions and then samples an action a to be performed by the agent from the probability distribution defined by the target action selection output $\pi$. For example, the system samples an action $a_2$ to be performed by the agent in response to the observation $s_2$ from the target action selection output $\pi_2$.

To generate a target action selection output in response to a given observation, the system uses the neural network 130 to perform a look ahead search, i.e., a look ahead search that is guided by the neural network in accordance with current values of the network parameters. Thus, the system performs the look ahead search using the neural network to select the actions for the agent instead of using the neural network to directly select the action.

In cases where the network output also includes a predicted return, the system also obtains a target return z after the terminal observation T of the episode. The target return can be based on whether the terminal state of the environment achieved the specified result, e.g., 1 if the terminal state achieves the result and 0 or −1 if the terminal state does not achieve the result.

For each of the observations encountered during the instance of performing the task, the system also generates an experience history that includes the observation, the target output generated in response to the observation through the look ahead search, and the target return z. For example, the system generates an experience history that includes the observation $s_2$ the target output $\pi_2$ and the target return z.

The system can then (asynchronously from generating the experience histories), use the experience histories to update the values of the parameters of the neural network 130. In particular, for an experience history that includes an observation s, a target output $\pi$ and target return z, the system processes the observation s using the neural network 130 to generate a network output that includes an action selection output p and a predicted return v. The system then trains the neural network 130 by adjusting the values of the network parameters so that the action selection output p more closely matches the target output $\pi$ and the predicted return v more closely matches the target return z.

Figure 3:
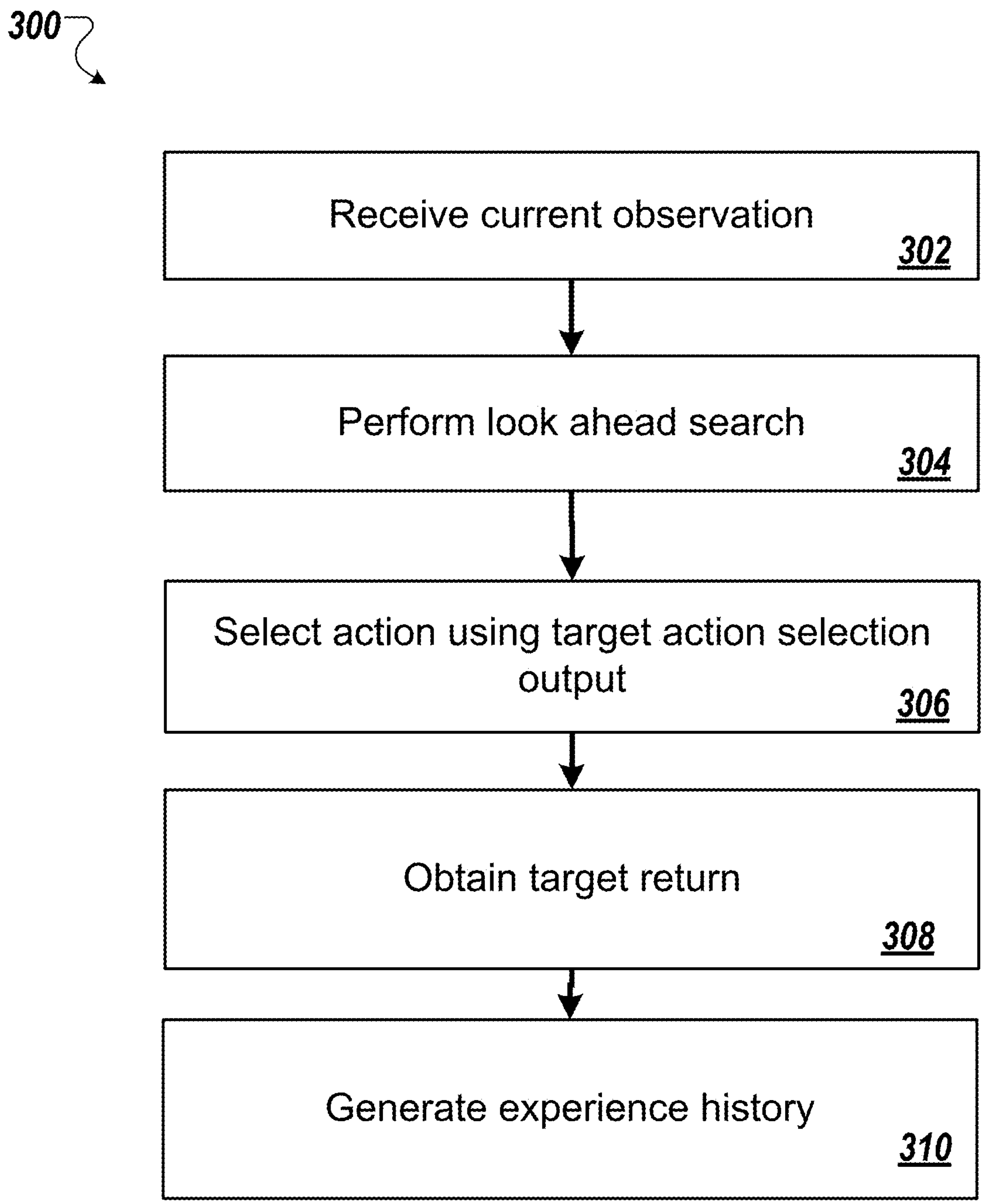
FIG. 3 is a flow diagram of an example process for generating an experience history.

FIG. 3 is a flow diagram of an example process 300 for generating an experience history. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system receives a current observation (step 302).

The system generates a target action selection output for the observation by performing a look ahead search using the neural network and in accordance with current values of the neural network (step 304). In particular, the system performs the look ahead search to traverse possible future states of the environment starting from the current state characterized by the current observation. The system continues the look ahead search until a possible future state that satisfies termination criteria is encountered. For example, the look ahead search may be a tree search and the criteria may be that the future state is represented by a leaf node in the state tree. Performing the look ahead search will be described in more detail below with reference to FIG. 4.

The system selects an action to be performed by the agent in response to the current observation using the target action selection output (step 306), e.g., by sampling from the probability distribution defined by the target action selection output.

The system obtains a target return (step 308). The target return is the return obtained by the system starting from after the action was performed and ending when the environment reaches the terminal state of the current episode. As described above, the target return reflects the progress of the agent towards achieving the specified result starting from being in the state characterized by the current observation. In many cases, the rewards are sparse and are only received at the terminal state.

The system generates an experience history that includes the current observation and a target network output that includes the target action selection output and the target return (step 310) and then stores the generated experience history in the experience history data store.

The system can repeat the process 300 for each observation received during an episode of interaction of the agent with the environment.

Figure 4:
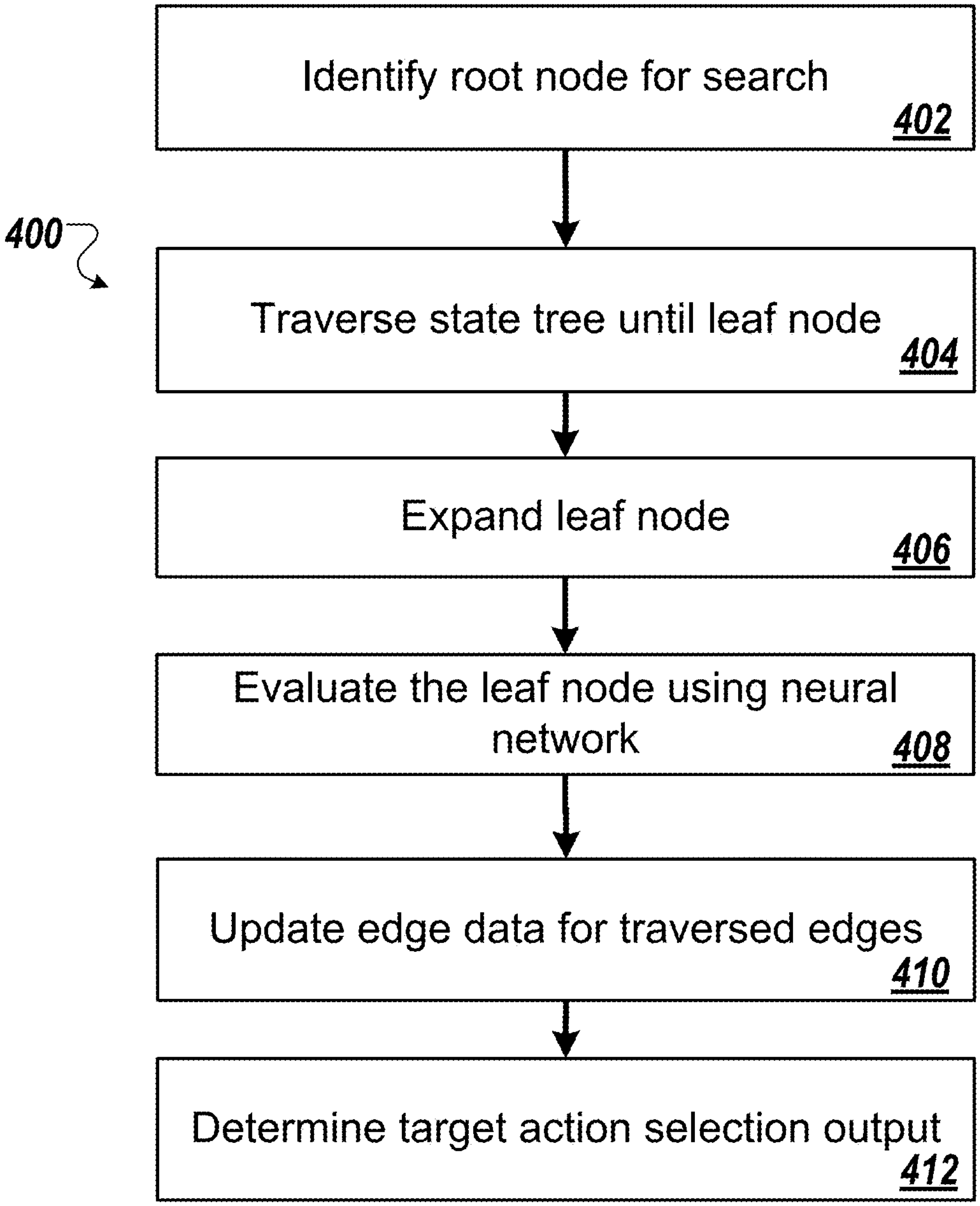
FIG. 4 is a flow diagram of an example process for performing a look ahead search.

FIG. 4 is a flow diagram of an example process 400 for performing a look ahead search of an environment using a neural network. For convenience, the process 400 will be described as being performed by a system of one or more computers located in one or more locations. For example, a reinforcement learning system, e.g., the reinforcement learning system 100 of FIG. 1, appropriately programmed in accordance with this specification, can perform the process 400.

The system receives data identifying a root node for the search, i.e., a node representing the state characterized by the current observation (step 402).

The system traverses the state tree until the state tree reaches a leaf state, i.e., a state that is represented by a leaf node in the state tree (step 404).

That is, at each in-tree node, i.e., a node encountered starting from the root node until reaching the leaf state, the system selects the edge to be traversed using the edge data for the outgoing edges from the in-tree node representing the in-tree state. The system may select the edge based on the action score or may determine an adjusted action score for selecting an edge.

In particular, for each outgoing edge from an in-tree node, the system may determine an adjusted action score for the edge based on the action score (Q(s,a)) for the edge, the visit count (N) for the edge, and the prior probability (P(s,a)) for the edge (described further later). Generally, the system computes the adjusted action score for a given edge by adding to the action score for the edge a bonus that is proportional to the prior probability for the edge but decays with repeated visits to encourage exploration. For example, the bonus may be directly proportional to the product of the prior probability and a ratio that has the square root of the sum of all visit counts for all outgoing edges from the root node as the numerator and a constant, e.g., one, plus the visit count for the edge representing the action as the denominator. For example the bonus may be dependent upon P(s,a)/(1+N).

The system then selects the edge with the highest adjusted action score as the edge to be traversed from the in-tree node.

In some cases, to further drive exploration of the state space, the system adds noise to the prior probabilities for the root node before selecting an action for the root node. For example, the system may interpolate between the actual prior probability for a given action and noise sampled from a Dirichlet process to generate the final prior probability that is used when selecting the action to be performed when at the root node.

The system continues traversing the state tree in this manner until a leaf node in the state tree is reached. Generally, a leaf node is a node in the state tree that has no child nodes, i.e., is not connected to any other nodes by an outgoing edge.

The system then expands the leaf node (step 406).

To expand the leaf node, the system may add a respective new edge to the state tree for each action that is a valid action to be performed by the agent in response to a leaf observation characterizing the state represented by the leaf node. The system also initializes the edge data for each new edge by setting the visit count and action scores for the new edge to zero.

The system evaluates the leaf node using the action selection neural network in accordance with the current values of the parameters to generate a respective prior probability for each new edge (step 408). To determine the prior probability for each new edge, the system may process the leaf observation using the action selection neural network and uses the action probabilities from the distribution defined by the network output as the prior probabilities for the corresponding edges. The system may also generate a predicted return for the leaf observation from the results of the processing of the leaf observation by the neural network.

The system then updates the edge data for the edges traversed during the search based on the predicted return for the leaf node (step 410).

In particular, for each edge that was traversed during the search, the system increments the visit count for the edge by a predetermined constant value, e.g., by one. The system also updates the action score for the edge using the predicted expected return for the leaf node by setting the action score equal to the new average of the predicted expected returns of all searches that involved traversing the edge.

The system determines the target action selection output for the current observation using the results of the look ahead search (step 412). In particular, the system determines the target network output using the visit counts for the outgoing edges from the root node after the edge data has been updated based on the results of the look ahead search. For example, the system can apply a softmax over the visit counts for the outgoing edges from the root node to determine the probabilities in the target network output. In some implementations, the softmax has a reduced temperature to encourage exploration of the state space. In some implementations, the softmax temperature is only reduced after a threshold number of look ahead searches have been performed within an episode to ensure that a diverse set of states are encountered during various episodes.

As described above, in some cases the system uses a simulated version of the environment to perform the look ahead search, e.g., to identify which state taking an action leads to when in a leaf state, to identify which states taking an action leads to when the outgoing edge for the action is not connected to any node in the tree, or to verify that the edge data for an in-tree node accurately reflects the transitions that will occur when a given action is selected.

In some implementations, the system distributes the searching of the state tree, i.e., by running multiple different searches in parallel on multiple different machines, i.e., computing devices, or in multiple threads on one or more such machines.

For example, the system may implement an architecture that includes a master machine that executes the main search. The entire state tree may be stored on the master, which only executes the in-tree phase of each simulation. The leaf positions are communicated to one or more workers, which execute the expansion and evaluation phase of the simulation.

In some cases, the system does not update the edge data until a predetermined number of look ahead searches have been performed since a most-recent update of the edge data, e.g., to improve the stability of the search process in cases where multiple different searches are being performed in parallel.

Figure 5:
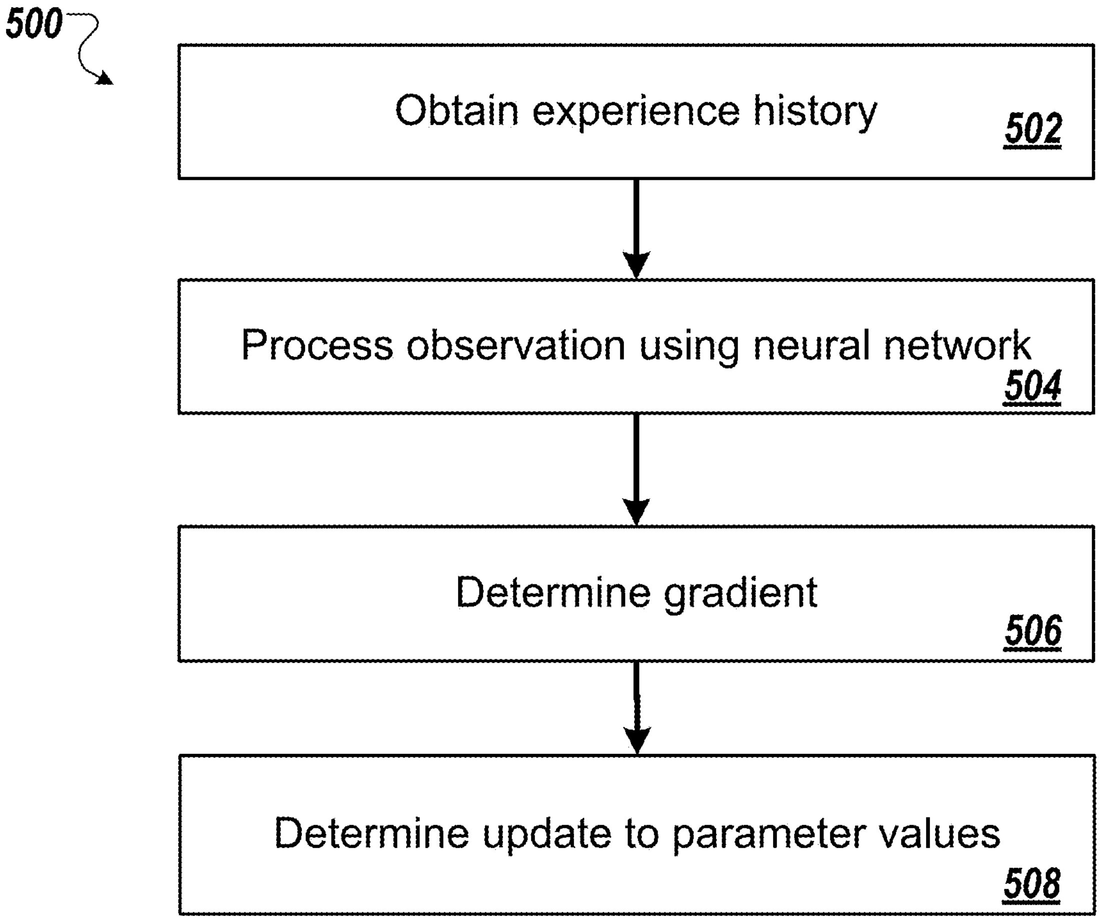
FIG. 5 is a flow diagram of an example process for determining an update to the current network parameter values.

FIG. 5 is a flow diagram of an example process 500 for determining an update to current values of the network parameters. For convenience, the process 500 will be described as being performed by a system of one or more computers located in one or more locations. For example, a reinforcement learning system, e.g., the reinforcement learning system 100 of FIG. 1, appropriately programmed in accordance with this specification, can perform the process 500.

The system obtains an experience history from the experience history data store (step 510). For example, the experience history can be one of a batch of experience histories sampled from the experience history data store.

The system processes the observation in the experience history using the neural network and in accordance with the current values of the network parameters to generate a training network output (step 520).

The system determines a gradient with respect to the network parameters of an objective function that encourages the training network output to match the training target network output in the experience history (step 530).

When the training network output and the experience history include only an action selection output, the objective function can measure a difference between the probability distribution in the training target network output and the probability distribution in the training network output. For example the objective function can be a cross entropy loss function.

When the training network output and the experience history include both an action selection output and a return, the objective function can be a weighted sum between (i) a difference between the probability distribution in the training target network output and the probability distribution in the training network output, e.g., a cross entropy loss between the two distributions, and (ii) a difference between the predicted expected return output in the training target network output and the predicted expected return output in the training network output, e.g., a mean squared difference. In either case, the objective function can also include one or more regularization terms, e.g., an L2 regularization term, to prevent overfitting.

Thus, optimizing the objective function encourages the neural network to generate action selection outputs that match the target action selection output and, when used, to generate predicted returns that match the target predicted returns.

The system determines an update to the current values of the network parameters from the gradient (step 540), i.e., uses the gradient as the update to the network parameters.

The system can perform the process 500 for each experience history in a batch of experience histories to determine a respective update for each of the experience histories. The system can then apply the updates to the current values of the network parameters to determine updated values of the parameters, i.e., in accordance with an update rule that is specified by the optimizer used by the system to train the neural network. For example, when the optimizer is a stochastic gradient descent optimizer, the system can sum all of the updates, multiply the sum by a learning rate, and then add the result to the current values of the network parameters.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers and of selecting, using a neural network, actions to be performed in an attempt to achieve a specified result, wherein the neural network has a plurality of network parameters and is configured to receive an input observation characterizing a state of an environment and to process the input observation in accordance with the network parameters to generate a network output that comprises an action selection output that defines an action selection policy for selecting an action to be performed in response to the input observation, and wherein the method comprises:

receiving a current observation characterizing a current state of the environment;

determining a target action selection output for the current observation by performing, using the neural network and in accordance with values of the network parameters, a look ahead search of possible future states of the environment starting from the current state until the environment reaches a possible future state that satisfies one or more termination criteria, wherein the look ahead search is a tree search of a state tree having nodes representing states of the environment starting from a root node that represents the current state; and selecting an action to be performed in response to the current observation using the target action selection output generated by performing the look ahead search.

2. The method of claim 1, wherein performing the look ahead search comprises evaluating leaf nodes of the state tree encountered during the look ahead search using the neural network and in accordance with the values of the network parameters.

3. The method of claim 2, wherein evaluating leaf nodes of the state tree encountered during the look ahead search using the trained neural network and in accordance with the values of the network parameters comprises, for each leaf node:

adding one or more new edges from the leaf node of the state tree;

processing a new observation characterizing a new state of the environment that is characterized by the leaf node using the neural network and in accordance with the values of the network parameters to generate a new action selection output; and generating, using the new action selection output, a respective prior probability for each of the one or more new edges.

4. The method of claim 1, wherein the values of the network parameters have been determined by training the neural network using target network outputs determined by performing look ahead searches using the neural network.

5. The method of claim 1, wherein performing the look ahead search comprises determining a respective visit count for each of a plurality of outgoing edges from the root node, each outgoing edge representing a respective action to be performed by the agent.

6. The method of claim 5, wherein the target action selection output comprises a respective probability for each action that is represented by an outgoing edge from the root node, and wherein determining the target action selection output comprises determining the target action selection output from the respective visit counts for the outgoing edges.

7. The method of claim 6, wherein performing the look ahead search comprises traversing the state tree starting from the root node until encountering a leaf node by selecting edges to be traversed using adjusted action scores for edges in the state tree.

8. The method of claim 6, wherein selecting an action to be performed in response to the current observation using the target action selection output generated by performing the look ahead search comprises:

sampling an action using the respective probabilities for the actions.

9. The method of claim 6, wherein determining the target action selection output from the respective visit counts for the outgoing edges comprises applying a softmax over the respective visit counts for the outgoing edges.

10. The method of claim 1, further comprising: storing the current observation and the target action selection output for use in training the neural network.

11. A method performed by one or more computers and of selecting, using a neural network, actions to be performed by an agent interacting with an environment to perform a task in an attempt to achieve a specified result, wherein the neural network has a plurality of network parameters and is configured to receive an input characterizing a state of the environment and to process the input in accordance with the network parameters to generate a network output, and wherein the method comprises:

receiving a current observation characterizing a current state of the environment;

determining a target action selection output for the current observation by performing, using the neural network and in accordance with values of the network parameters, a look ahead search of possible future states of the environment starting from the current state until the environment reaches a possible future state that satisfies one or more termination criteria, wherein the look ahead search is a tree search of a state tree having nodes representing states of the environment starting from a root node that represents the current state; and selecting an action to be performed by the agent in response to the current observation using the target action selection output generated by performing the look ahead search.

12. The method of claim 11, wherein performing the look ahead search comprises evaluating leaf nodes of the state tree encountered during the look ahead search using the neural network and in accordance with the values of the network parameters.

13. The method of claim 12, wherein evaluating leaf nodes of the state tree encountered during the look ahead search using the trained neural network and in accordance with the values of the network parameters comprises, for each leaf node:

adding one or more new edges from the leaf node of the state tree;

processing a new observation characterizing a new state of the environment that is characterized by the leaf node using the neural network and in accordance with the values of the network parameters to generate a new action selection output; and generating, using the new action selection output, a respective prior probability for each of the one or more new edges.

14. The method of claim 11, wherein the values of the network parameters have been determined by training the neural network using target network outputs determined by performing look ahead searches using the neural network.

15. The method of claim 11, wherein performing the look ahead search comprises determining a respective visit count for each of a plurality of outgoing edges from the root node, each outgoing edge representing a respective action to be performed by the agent.

16. The method of claim 15, wherein the target action selection output comprises a respective probability for each action that is represented by an outgoing edge from the root node, and wherein determining the target action selection output comprises determining the target action selection output from the respective visit counts for the outgoing edges.

17. The method of claim 16, wherein performing the look ahead search comprises traversing the state tree starting from the root node until encountering a leaf node by selecting edges to be traversed using adjusted action scores for edges in the state tree.

18. The method of claim 16, wherein selecting an action to be performed in response to the current observation using the target action selection output generated by performing the look ahead search comprises:

sampling an action using the respective probabilities for the actions.

19. The method of claim 16, wherein determining the target action selection output from the respective visit counts for the outgoing edges comprises applying a softmax over the respective visit counts for the outgoing edges.

20. A system comprising one or more computers and one or more storage devices storing instructions that when executed by the one or more computers cause the one or more computers to perform operations comprising selecting, using a neural network, actions to be performed in an attempt to achieve a specified result, wherein the neural network has a plurality of network parameters and is configured to receive an input observation characterizing a state of an environment and to process the input observation in accordance with the network parameters to generate a network output that comprises an action selection output that defines an action selection policy for selecting an action to be performed in response to the input observation, and wherein the method comprises:

receiving a current observation characterizing a current state of the environment;

determining a target action selection output for the current observation by performing, using the neural network and in accordance with values of the network parameters, a look ahead search of possible future states of the environment starting from the current state until the environment reaches a possible future state that satisfies one or more termination criteria, wherein the look ahead search is a tree search of a state tree having nodes representing states of the environment starting from a root node that represents the current state; and selecting an action to be performed in response to the current observation using the target action selection output generated by performing the look ahead search.

* * * * *